United States Patent
Koning et al.

(10) Patent No.: US 9,021,457 B2
(45) Date of Patent: Apr. 28, 2015

(54) METHOD AND SYSTEM FOR DYNAMICALLY RESIZING ENCLOSED STORAGE DEVICE PARTITIONS

(71) Applicant: Apple Inc., Cupertino, CA (US)

(72) Inventors: Ben A. Koning, San Jose, CA (US); Jim F. Kateley, San Jose, CA (US)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 13/747,244

(22) Filed: Jan. 22, 2013

(65) Prior Publication Data

US 2014/0208091 A1    Jul. 24, 2014

(51) Int. Cl.
G06F 9/44    (2006.01)
G06F 3/06    (2006.01)

(52) U.S. Cl.
CPC ............ *G06F 9/4401* (2013.01); *G06F 3/0631* (2013.01)

(58) Field of Classification Search
None
See application file for complete search history.

(56) References Cited

U.S. PATENT DOCUMENTS

| | | | |
|---|---|---|---|
| 6,453,383 B1 * | 9/2002 | Stoddard et al. | 711/112 |
| 6,920,555 B1 | 7/2005 | Peters et al. | |
| 7,136,994 B2 * | 11/2006 | Zimmer et al. | 713/2 |
| 7,519,806 B2 | 4/2009 | Stutton et al. | |
| 8,219,795 B2 | 7/2012 | Amou | |
| 2004/0158699 A1 * | 8/2004 | Rhoads et al. | 713/1 |
| 2007/0046791 A1 * | 3/2007 | Wang et al. | 348/231.6 |
| 2007/0180206 A1 * | 8/2007 | Craft et al. | 711/162 |
| 2009/0210464 A1 * | 8/2009 | Chiang-Lin | 707/205 |
| 2009/0307477 A1 * | 12/2009 | Matthew et al. | 713/2 |
| 2010/0031244 A1 * | 2/2010 | Koba | 717/168 |
| 2011/0029726 A1 * | 2/2011 | Fujimoto | 711/103 |
| 2011/0173601 A1 * | 7/2011 | de los Reyes | 717/169 |
| 2012/0054734 A1 | 3/2012 | Andrews et al. | |
| 2012/0124419 A1 * | 5/2012 | Matthew | 714/20 |
| 2012/0260049 A1 | 10/2012 | Yao et al. | |
| 2012/0278532 A1 | 11/2012 | Bolanowski | |

OTHER PUBLICATIONS

Halsey, Mike. "Solving Windows Image Backup Problems." Everything-Microsoft.com. Everything-Microsoft, Sep. 10, 2010. Web. Jun. 23, 2014. <http://www.everything-microsoft.com/2010/09/10/solving-windows-image-backup-problems/>.*
Microsoft. "Windows 7 System Requirements." Microsoft.com. Web. Aug. 17, 2010. <http://web.archive.org/web/20100817171829/http://windows.microsoft.com/en-us/windows7/products/system-requirements>.*
"The Windows System and Boot Partitions." Multibooters.com. Web. Jun. 19, 2014. <http://www.multibooters.com/articles/system-and-boot-partitions.html>.*

(Continued)

*Primary Examiner* — Wei Zhen
*Assistant Examiner* — Binh Luu
(74) *Attorney, Agent, or Firm* — Womble Carlyle Sandridge & Rice, LLP

(57) ABSTRACT

A computer-implemented method for updating a recovery operating system (OS) stored in a boot partition of a storage device. The method involves booting, via host operating system (OS) boot files stored in the boot partition, a host OS that is stored in a host partition of the storage device, receiving a request to update a recovery OS also stored in the boot partition, determining the recovery OS update requires additional storage space of size Z to be added to the boot partition, decreasing the size of the host partition by the size Z, increasing the size of the boot partition by the size Z, and updating the recovery OS.

20 Claims, 10 Drawing Sheets

(56) References Cited

OTHER PUBLICATIONS

"System requirements for Windows XP operating systems." Microsoft Support. Microsoft, Sep. 14, 2007. Web. Jan. 29, 2015. <https://web.archive.org/web/20120104194941/http://support.microsoft.com/kb/314865>.*

"System requirements for Windows Vista." Microsoft Support. Microsoft, Jun. 28, 2011. Web. Jan. 29, 2015. <https://web.archive.org/web/20120111083601/http://support.microsoft.com/kb/919183>.*

"Partitioning hard disk (primary and extended partitions)." Optimizing PC. N.p., Feb. 5, 2011. Web. Jan. 29, 2015. <https://web.archive.org/web/20110205090451/http://www.optimizingpc.com/install/partitioningharddisk.html>.*

"Resizing (shrinking) the Windows partition when there is a recovery partition." Optimizing PC. N.p., Jan. 13, 2011. Web. Jan. 29, 2015. <https://web.archive.org/web/20110113040507/http://www.optimizingpc.com/miscellaneous/resize_windowspartition_recoverypartition.html>.*

* cited by examiner

METHOD AND SYSTEM FOR DYNAMICALLY RESIZING ENCLOSED STORAGE DEVICE PARTITIONS

TECHNICAL FIELD

The present invention relates generally to portable computing devices. More particularly, the present embodiments relate to a method and system for dynamically resizing enclosed partitions in storage devices.

BACKGROUND

Modern computing devices typically include a main storage device (e.g., a hard disk drive or a solid state drive) that stores operating system (OS) files and user files. According to one common configuration, the storage device is segmented into at least two partitions: 1) a "host" partition that stores both the OS files and the user files, and 2) a "boot" partition that stores files used to boot the OS when the computing device is powered-on. In this configuration, a basic input/output (BIOS) system of the computing device, when powered-on, reads and then executes the files in the boot partition to cause the OS files stored on the host partition to properly initialize and execute on the computing device.

In some cases, the host partition and/or the boot partition can become corrupted, for example, when a user interrupts the computing device during a shutdown procedure. When this occurs, the computing device cannot properly boot during the next power-on, thereby rendering the computing device inoperable. One common approach used to recover such an inoperable computing device involves utilizing an optical disc drive included in the computing device. In particular, the user inserts into the optical disc drive a compact disc (CD) that includes a "recovery" OS that the computing device can read from the CD and execute when the inoperable computing device is powered-on. Typically, the recovery OS enables the user to perform a variety of tasks to repair the computing device, which include identifying and fixing the corrupted host/boot partition files or enacting a complete deletion and reinstallation of the OS.

Although the optical disc drives provide a reliable solution to the foregoing problem, they are nonetheless being phased-out for a variety of reasons, which include the pursuit of effecting overall decreases in the number of moving parts, weight and power consumption of computing devices. To address this change, engineers have established a new technique for enabling users to recover inoperable computing devices that do not include optical disc drives. One popular technique involves storing within the boot partition a version of the recovery OS described above. In this way, the user can choose, during a power-on of the computing device, to load the recovery OS stored in the boot partition and perform one of the repair tasks described above. Notably, the boot partition is, in most cases, sized at or around the minimum amount of space required to store the recovery OS/OS boot files in order to maximize the amount of free storage space available to other partitions on the storage device, e.g., the host partition.

Oftentimes, it is desirable to replace the recovery OS with a newer, updated version that enhances the repair process of the computing device in the event that it becomes inoperable. As is typical with most software updates, the updated version of the recovery OS will likely be larger in size than any current recovery OS stored in the boot partition. Considering that the boot partition is sized to fit only the recovery OS stored therein, the boot partition must be first be resized in order to accommodate the updated, larger version of the recovery OS. However, several limitations exist with respect to resizing partitions. For example, some file system limitations dictate that a partition can be "grown" (i.e., increased in size) from the end of the partition, but cannot be grown from the start of the partition. This limitation makes increasing the size of the boot partition problematic when the end of the boot partition abuts the start of another partition. Another example file system limitation, due to the lack of safety of an overlapping block copy process, dictates that the size of a partition can only be increased by a size greater than 2*N where N is the current size of the partition, which results in wasteful consumption of free storage space within the storage device when the additional amount of space required to store the updated recovery OS is only marginal.

The limitations described above have forced developers into implementing recovery OS upgrade processes that are highly susceptible to failure, e.g., deleting the existing boot partition and then regenerating a new boot partition of an increased size. Notably, if the power supply to the computing device were disconnected immediately after deletion of the boot partition, then the storage device is left void of a boot partition and cannot execute a host OS boot or a recovery OS boot when restarted. Such a scenario—combined with the absence of an optical disc drive from the computing device—results in the computing device being "bricked" and totally inoperable, with no route available for a software-based recovery.

SUMMARY

This paper describes various embodiments that relate to upgrading a recovery OS stored in a boot partition of a computing device. In particular, a partition manager receives a request to replace a current recovery OS stored in the boot partition with an updated recovery OS, where the size of the boot partition must be increased to accommodate the updated recovery OS. The partition manager is configured to carry out the recovery OS update in a manner that significantly reduces both the number and length of windows (i.e., time spent) where an event such as a power failure would corrupt the boot partition and render the computing device incapable of booting. Moreover, the partition manager is configured to carry out the recovery OS update in a manner that eliminates the necessity to resize and/or relocate additional partitions, if any, that enclose the boot partition, such as additional partitions for storing user data. This helps avoid the additional risk of damaging important data within the computing device that should not be put at risk when executing the recovery OS update.

One embodiment of the present invention sets forth a method for updating a recovery operating system (OS) stored in a boot partition of a storage device. The method includes the steps of booting, via host operating system (OS) boot files stored in the boot partition, a host OS that is stored in a host partition of the storage device, receiving a request to update a recovery OS also stored in the boot partition, determining the recovery OS update requires additional storage space of size Z to be added to the boot partition, decreasing the size of the host partition by the size Z, increasing the size of the boot partition by the size Z, and updating the recovery OS.

Other embodiments include a system that is configured to carry out the method steps described above, as well as a non-transitory computer readable medium storing instructions that, when executed by a processor, cause the processor to carry out the method steps described above.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

Figure 1:
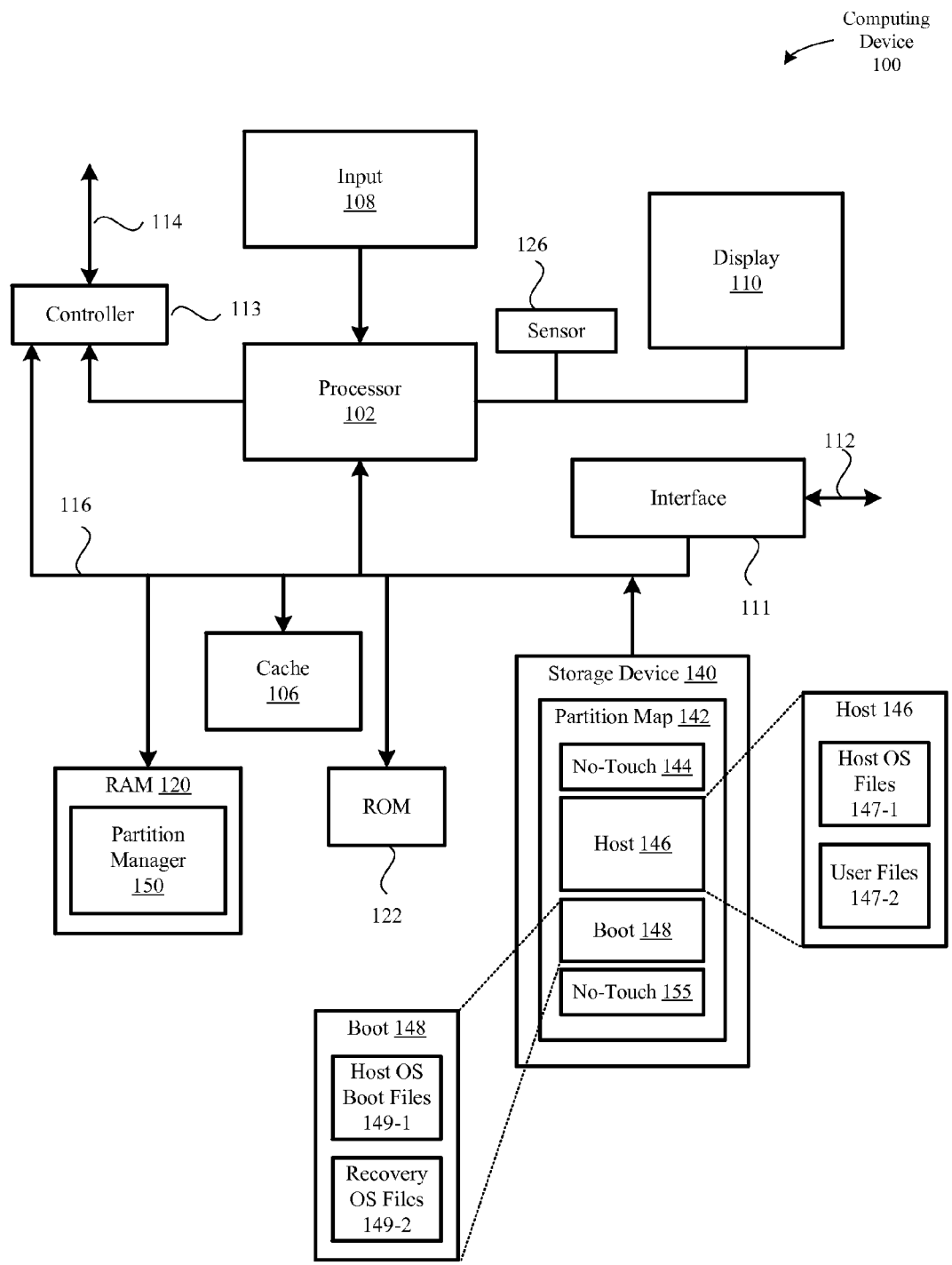
FIG. 1 is a block diagram of a computing device suitable for implementing the embodiments described herein.

FIG. 1 is a block diagram of a computing device 100 suitable for implementing the embodiments described herein. As shown in FIG. 1, computing device 100 can include a processor 102 that pertains to a microprocessor or controller for controlling the overall operation of computing device 100. Computing device 100 can also include user input device 108 that allows a user of the computing device 100 to interact with the computing device 100. For example, user input device 108 can take a variety of forms, such as a button, keypad, dial, touch screen, audio input interface, visual/image capture input interface, input in the form of sensor data, etc. Still further, computing device 100 can include a display 110 (screen display) that can be controlled by processor 102 to display information to the user. Data bus 116 can facilitate data transfer between at least storage device 140, cache 106, processor 102, and controller 113. Controller 113 can be used to interface with and control different equipment through equipment control bus 114.

Computing device 100 can also include a network/bus interface 111 that couples to data link 112. Data link 112 can allow computing device 100 to couple to a host computer or to accessory devices. The data link 112 can be provided over a wired connection or a wireless connection. In the case of a wireless connection, network/bus interface 111 can include a wireless transceiver. Sensor 126 can take the form of circuitry for detecting any number of stimuli. For example, sensor 126 can include any number of sensors for monitoring a manufacturing operation such as for example a Hall Effect sensor responsive to external magnetic field, an audio sensor, a light sensor such as a photometer, computer vision sensor to detect clarity, a temperature sensor to monitor a molding process and so on.

Computing device 100 also includes storage device 140, which can comprise a single disk or a plurality of disks, and includes a partition map 142 that defines one or more partitions within the storage device 140. In the example illustrated in FIG. 1, and described herein, the partition map 142 is configured to include four different partitions: no-touch partitions 144 and 155, a host partition 146 and a boot partition 148. Notably, one or more no-touch partitions 144 and 155 are included to highlight the benefits provided by the embodiments of the present invention, but should not be construed as being required to implement the embodiments. The host partition 146 is configured to store various files, which include 1) host OS files 147-1, which are files related to an operating system (OS) that is configured to execute on the computing device 100, and 2) user files 147-2, which are files (e.g., documents and pictures) associated with a user of the computing device 100. The boot partition 148 is also configured to store various files, which include 1) host OS boot files 149-1, which are files related to booting the OS files 147-1 stored in the host partition 146, and 2) recovery OS files 149-2, which are files that comprise a recovery OS.

According to the example configuration of partition map 142 shown in FIG. 1, the no-touch partitions 144 and 150 enclose both the host partition 146 and the boot partition 148. Also, the end of the host partition 146 abuts the start of the boot partition 148. The various partitions included in the instance of partition map 142 are configured in this manner to establish common constraints that exist with respect to how the host partition 146 and the boot partition 148 can be shrunk/grown/relocated—which, as described herein, are carried out during an upgrade of the recovery OS files 149-2 stored in the boot partition 148.

In some embodiments, storage device 140 can be flash memory, semiconductor (solid state) memory or the like. Storage device 140 can typically provide high capacity storage capability for the computing device 100. However, since the access time to the storage device 140 can be relatively slow (especially if storage device 140 includes a mechanical disk drive), the computing device 100 can also include cache 106. The cache 106 can include, for example, Random-Access Memory (RAM) provided by semiconductor memory.

The relative access time to the cache 106 can be substantially shorter than for storage device 140. However, cache 106 may not have the large storage capacity of storage device 140. The computing device 100 can also include RAM 120 and Read-Only Memory (ROM) 122. The ROM 122 can store programs, utilities or processes to be executed in a non-volatile manner. The RAM 120 can provide volatile data storage, such as for cache 106, and stores instructions related to a partition manager 150 that is configured to carry out the various techniques described herein.

As set forth in greater detail herein, embodiments of the invention are directed to a technique that involves updating a recovery OS stored in the boot partition 148. In particular, the partition manager 150 receives a request to update the current recovery OS stored in the boot partition 148 with an updated recovery OS, where the total size of the updated recovery OS is greater than the total size of the current recovery OS by a difference of a size Z (e.g., 1 MB). In most cases, the boot partition 148 is sized to store only the files currently included therein; thus, the boot partition 148 must be increased in size in order to replace the current recovery OS with the updated recovery OS. The following description sets forth details of a technique that significantly reduces a number of vulnerabilities related to increasing the size of the boot partition 148 when updating the recovery OS stored therein.

Figure 2:
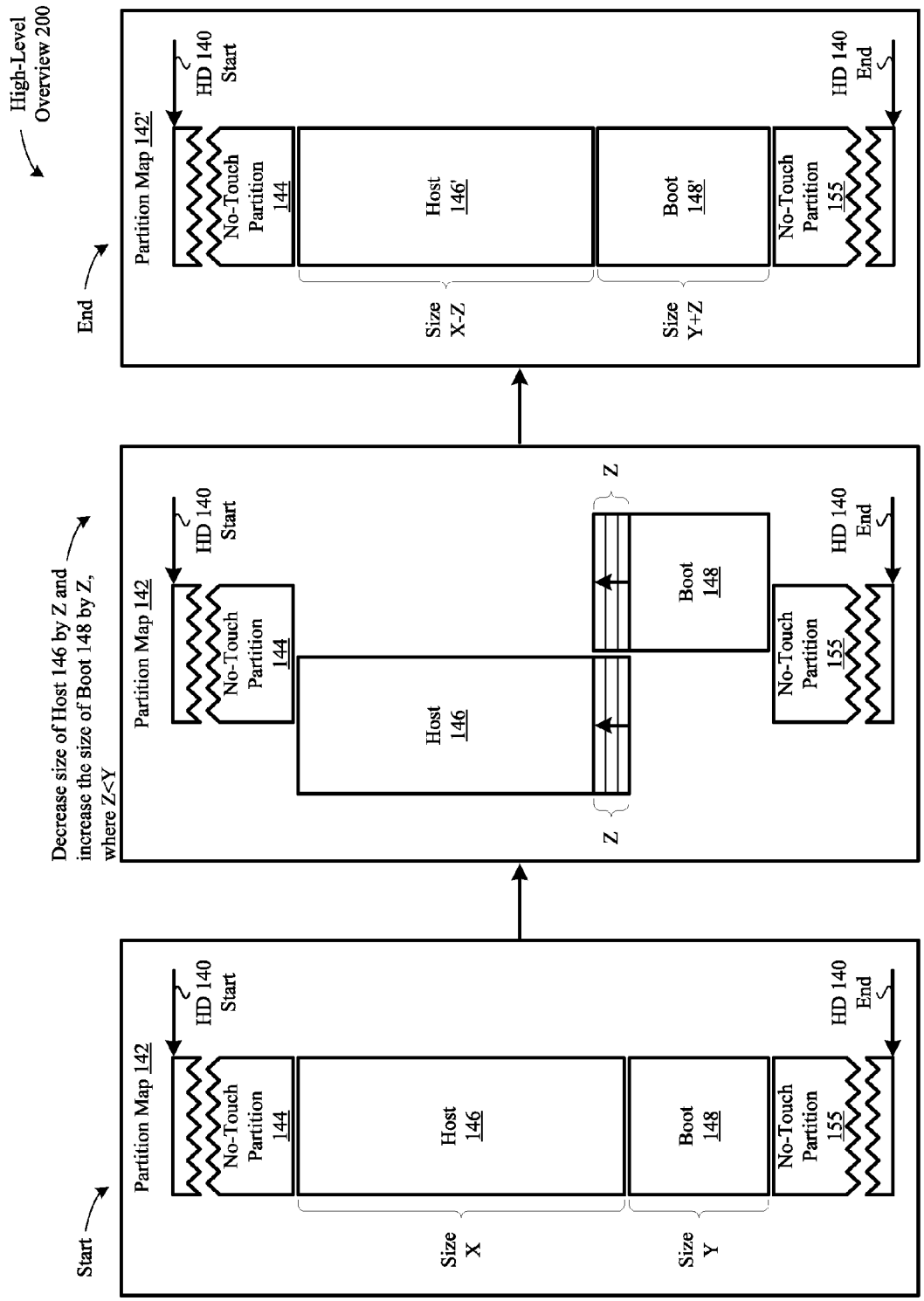
FIG. 2 illustrates a high-level overview of a technique that involves resizing both a host partition a boot partition to perform an upgrade of a recovery OS stored in the boot partition.
Figure 3:
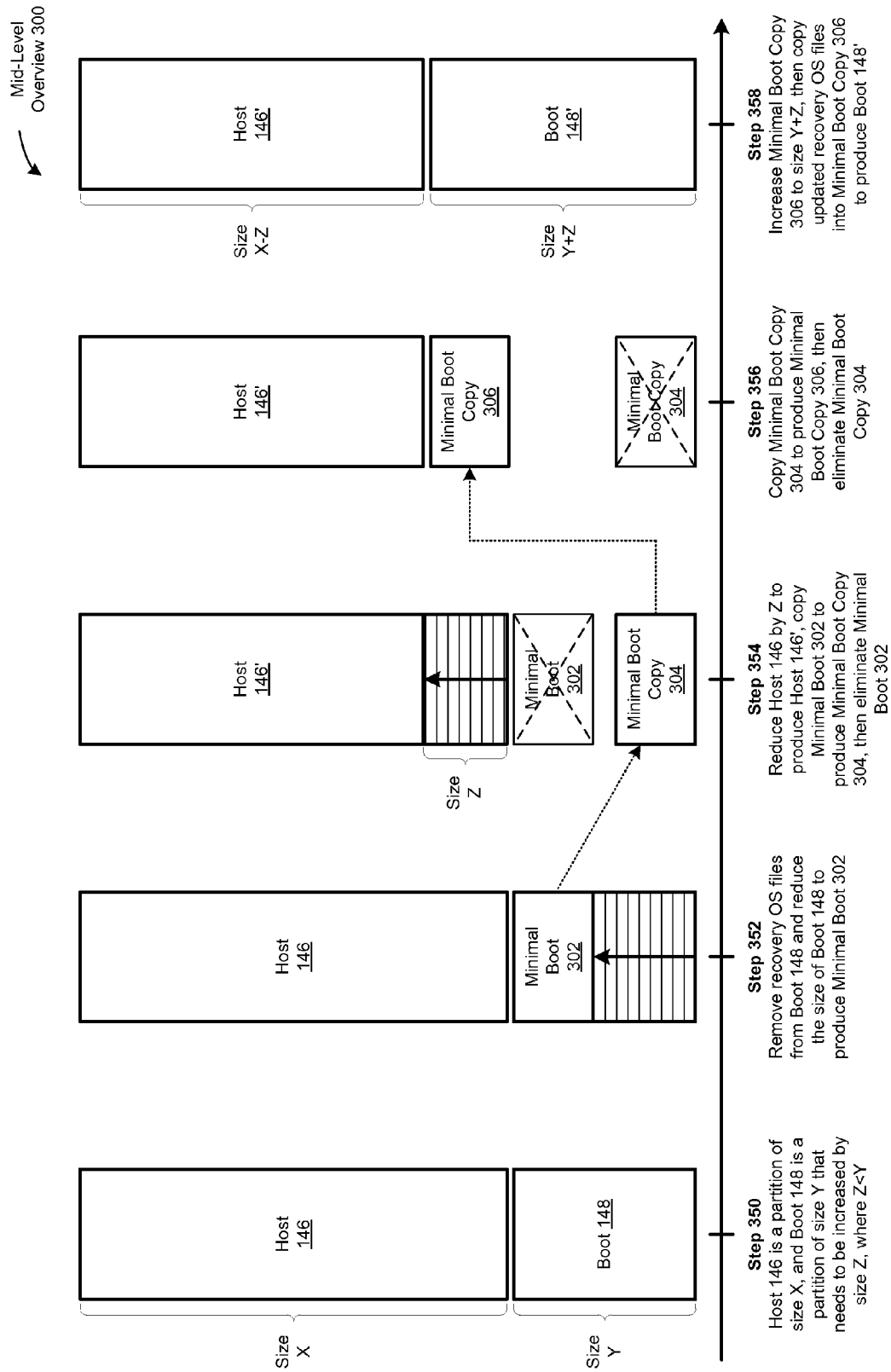
FIG. 3 illustrates a mid-level overview of the technique illustrated in FIG. 2 and provides additional detail to FIG. 2.

In particular, FIG. 2 illustrates a high-level overview 200 of a technique that involves resizing both the host partition 146 and the boot partition 148 to perform an upgrade of the recovery OS files 149-2 stored in the boot partition 148. FIG. 3 illustrates a mid-level overview 300 of the technique illustrated in FIG. 2 and provides additional detail to FIG. 2. FIGS. 4A-4D illustrate a low-level overview 400 of the technique illustrated in FIGS. 2 and 3 and provides additional detail to FIGS. 2 and 3. Finally, FIGS. 5A-5C illustrate a diagram of a method 500 for carrying out the technique illustrated in FIGS. 2, 3 and 4A-4D.

As noted above, FIG. 2 illustrates a high-level overview 200 of a technique that involves resizing both the host partition 146 and the boot partition 148 to perform an upgrade of the recovery OS files 149-2 stored in the boot partition 148, according to one embodiment of the invention. As shown in FIG. 2, the technique involves increasing the size of the boot partition 148 by a size Z, e.g., 1 MB, and correspondingly decreasing the size of the host partition 146 by the size Z, where Z is less than the size of Y. In most cases, the size Z is less than the size Y, but the invention is not so limited and may carry out the same operation when Z>Y, so long as there is an amount of free space Z available in the host partition 146.

As described in further detail herein, the technique does not require any modification to the no-touch partitions 144 and 155, thereby reducing overall overhead and latency associated with executing the technique. Upon completion, the no-touch partitions 144 and 155 are left untouched, the host partition 146 of size X becomes the host partition 146' of size X−Z, and the boot partition 148 of size Y becomes the boot partition 148' of size Y+Z.

FIG. 3 illustrates a mid-level overview 300 of the technique illustrated in FIG. 2 and provides additional detail to FIG. 2. For the purposes of simplification, the no-touch partitions 144 and 155 are not illustrated in FIG. 3. As shown in FIG. 3, the technique begins at step 350, where, as described above, the host partition 146 is a partition of size X and the boot partition 148 is a partition of size Y. At step 352, the partition manager 150 removes the recovery OS files 149-2 from the boot partition 148. Notably, removing the recovery OS files 149-2 does not affect the ability of the computing device 100 to boot since the host OS boot files 149-1 remain intact throughout the recovery OS upgrade process described herein.

Continuing at step 352, when the partition manager 150 has successfully removed the non-critical recovery OS files 149-2, the partition manager 150 reduces the size of the boot partition 148 to produce a minimal boot partition 302. In one embodiment, the partition manager 150 analyzes the recovery OS files 149-2 that were removed to determine a size by which the boot partition 148 can be decreased. In particular, the partition manager 150 checks to make sure that the size of the boot partition 148 can be reduced by at least half. Doing so ensures that there is ample room for the reduced boot partition 148 to be block-copied within the partition space that the boot partition 148 occupied prior to being reduced—which, as set forth below, ultimately enables the partition manager 150 to execute the technique in a manner that eliminates several vulnerabilities, as described in further detail below.

At step 354, the partition manager 150 reduces the size of the host partition 146 by the size Z to produce a host partition 146'. Again, reducing the size of the host partition 146 creates additional space within the storage device 140 to be consumed by a larger replacement boot partition 148. Continuing with step 354, the partition manager 150 copies the minimal boot partition 302 to produce a minimal boot copy partition 304. Notably, the partition manager 150 copies the minimal boot copy partition 304 into a location within the storage device 140 according to the illustration of FIG. 3 (i.e., as far down as possible) instead of copying the minimal boot copy partition 304 into a location that lies immediately after the end of host partition 146'. Importantly, placing the minimal boot copy partition 304 immediately after the end of host partition 146' would require the partition manager 150 to actively overwrite the minimal boot partition 302, which introduces several vulnerabilities. For example, a power failure during such an active overwrite would likely result in the computing device 100 being left with a storage device 140 with no readable boot partition, and would render the computing device 100 completely inoperable. Notably, the next partition to follow the host partition 146'—the minimal boot copy 304—continues to include data that can be used to boot the computing device 100.

Continuing with step 354, the partition manager 150 eliminates the minimal boot partition 302 after the minimal boot copy partition 304 has been successfully block-copied. At step 356, the partition manager 150 copies the minimal boot copy partition 304 to produce a minimal boot copy partition 306. As illustrated in FIG. 3, and described in further detail herein, the partition manager 150 configures the minimal boot copy partition 306 to abut the end of the host partition 146'. In this way, the partition manager 150 is able to exploit the size reduction of the host partition 146 and eventually increase the size of the minimal boot copy partition 306 to accommodate an updated recovery OS, as described below at step 358. Continuing with step 356, the partition manager 150 deletes the minimal boot copy partition 304 after the minimal boot copy partition 306 has been completed copied.

Finally, at step 358, the partition manager 150 increases the minimal boot copy partition 306 to the size Y+Z, and then copies new recovery OS files into the minimal boot copy partition 306 to produce a boot partition 148'. Accordingly, the boot partition 148 has been transformed into the boot partition 148' and resized from the size Y to the size Y+Z, such that the boot partition 148' can accommodate new recovery OS files that require size Z of additional storage space to be stored within the boot partition 148.

Figure 4A:
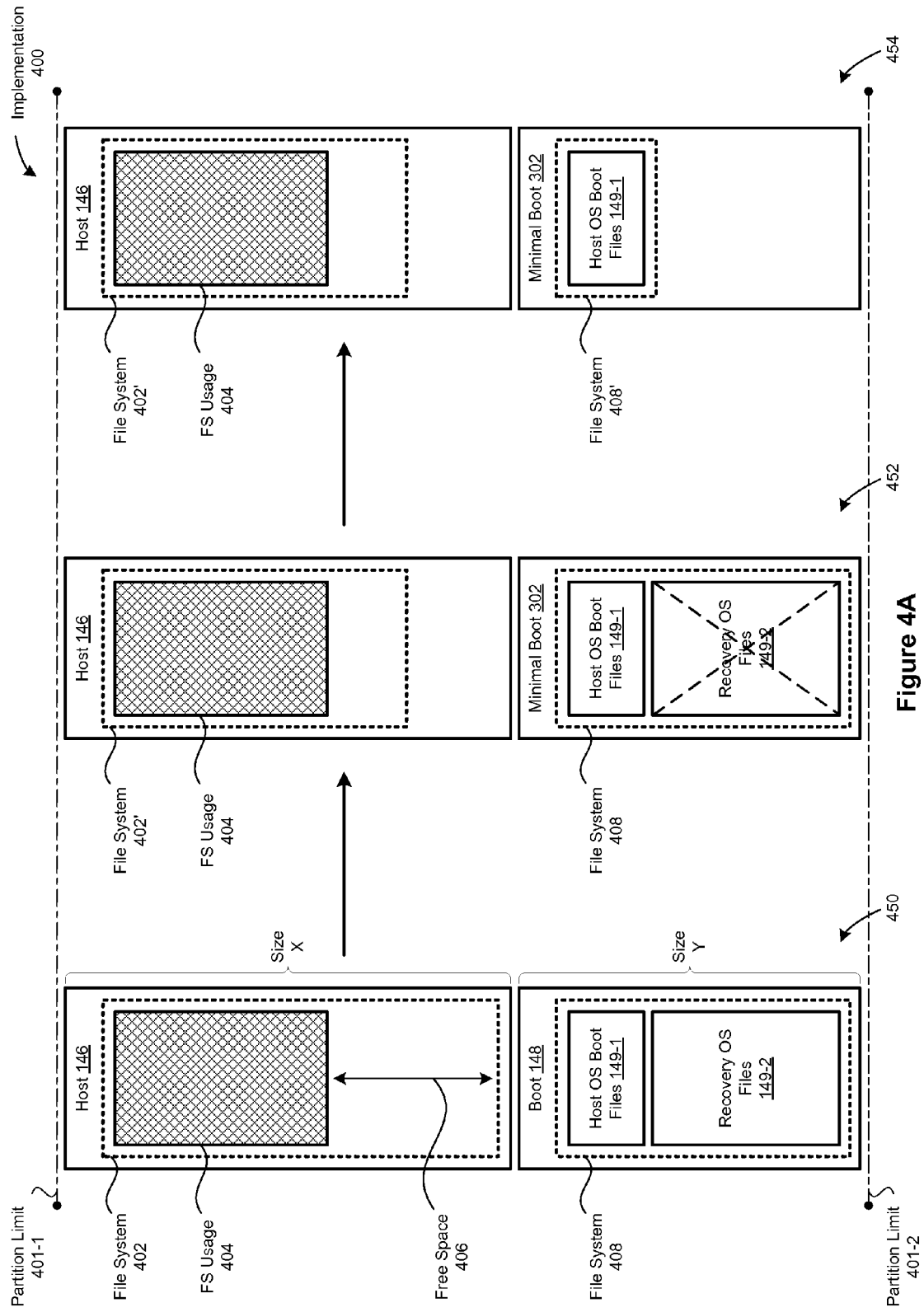
FIGS. 4A-4D illustrate a low-level overview of the technique illustrated in FIGS. 2 and 3 and provides additional detail to FIGS. 2 and 3.

FIGS. 4A-4D illustrate a low-level overview 400 of the technique illustrated in FIGS. 2 and 3 and provides additional detail to FIGS. 2 and 3. In particular, FIGS. 4A-4D illustrate how respective file systems of the host partition 146 and the boot partition 148 are resized during the technique to enable the host partition 146 and the boot partition 148 to be safely resized. As shown in FIG. 4A, at step 450, the start of the host partition abuts a partition limit 401-1 that represents a boundary not to be crossed when executing the resizing technique. This boundary may be, for example, the starting point of the storage device 140, or the end of another partition included in the storage device 140, e.g., the no-touch partition 144. Also shown in FIG. 4A is a partition limit 401-2 that abuts the end of the boot partition 148. The partition limit 401-2, like the partition limit 401-1, is not to be crossed when executing the resizing technique. Thus, the partition limits 401-1 and 401-2 illustrated across FIGS. 4A-4D highlight that the resizing technique is executed in-place, i.e., any partitions that enclose the host partition 146 and the boot partition 148 are not affected by the resizing operations described herein.

As shown in FIG. 4A, the host partition 146 is configured to include a file system 402. An example usage level of the file system 402 is represented by file system (FS) usage 404 and free space 406. As described in further detail herein, the free space 406 includes at least enough free space to accommodate the size Z by which the boot partition 148 needs to be resized. As also shown in FIG. 4A, the boot partition 148 is configured to include a file system 408. The file system 408 includes the host OS boot files 149-1 of FIG. 1 as well as the recovery OS files 149-2 of FIG. 1. According to the illustration in FIG. 4A, the file system 408 includes little or no free storage space to accommodate new recovery OS files that require more storage space to be stored in the boot partition 148, thereby necessitating a resize of the boot partition 148.

As shown in FIG. 4A, the resizing technique begins at step 452 and involves the partition manager 150 reducing the size of the file system 402 to produce a file system 402'. In general, the partition manager 150 reduces the size of the file system 402 by the size Z, which, as described herein, is the additional size that is required to store an updated recovery OS within the boot partition 148. Step 452 also involves the partition manager 150 removing the recovery OS files 149-2 from the boot partition 148. However, the host OS boot files 149-1 are left intact such that the computing device 100 is still capable of booting if the resizing technique were to fail during step 452.

Figure 4B:
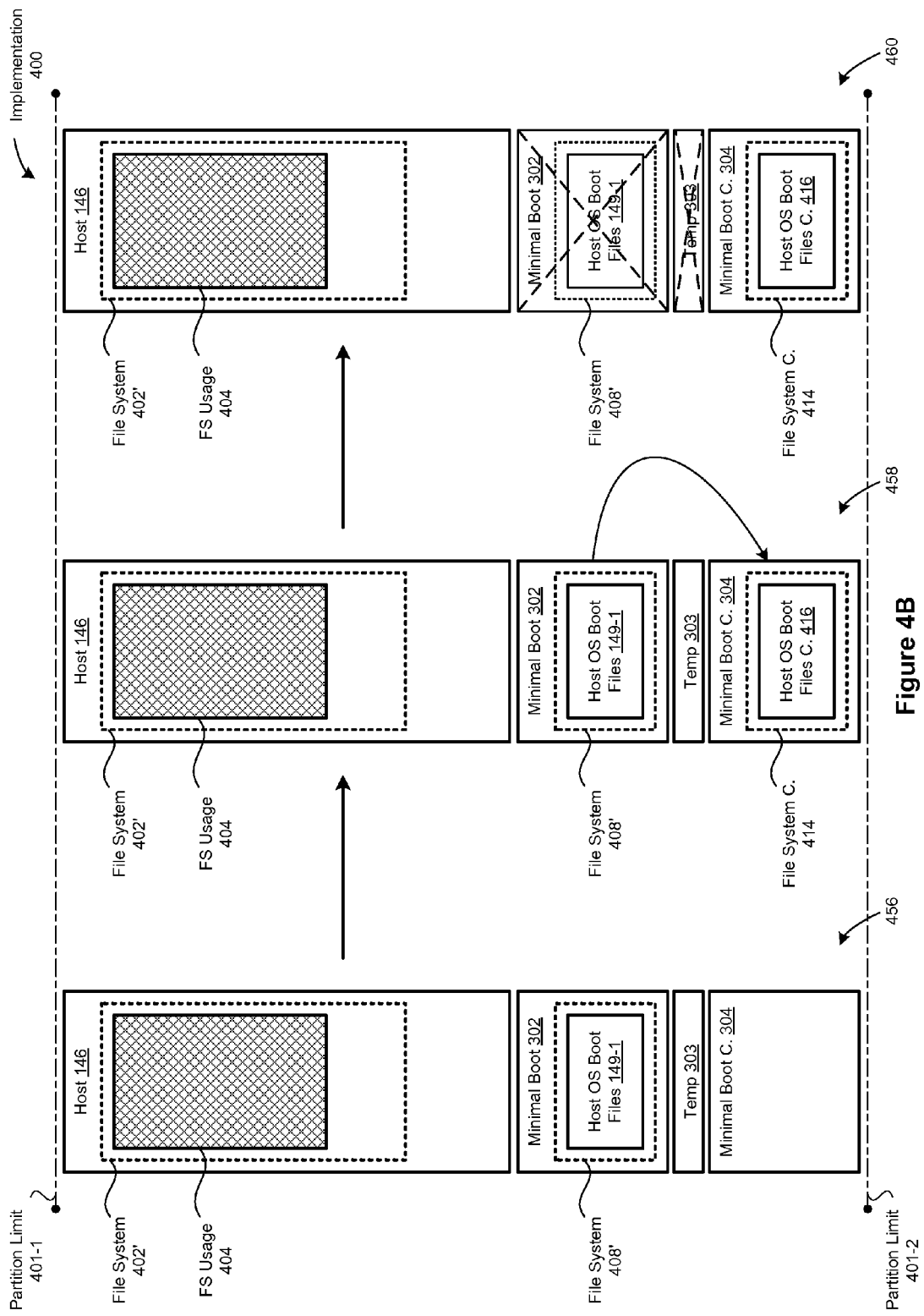
Figure 5A:
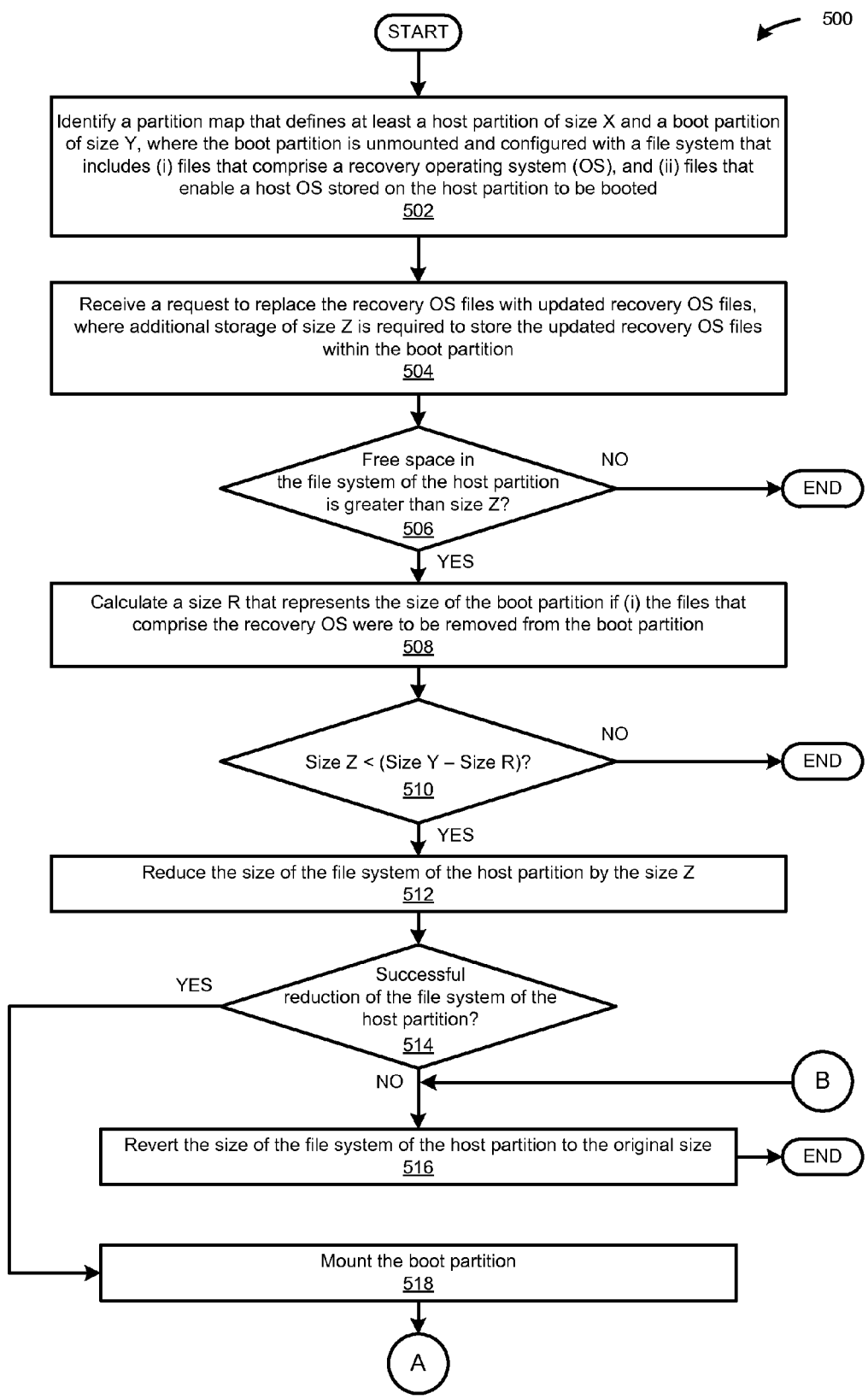
FIGS. 5A-5C illustrate a method diagram for carrying out the technique illustrated in FIGS. 2, 3 and 4A-4D.
Figure 5B:
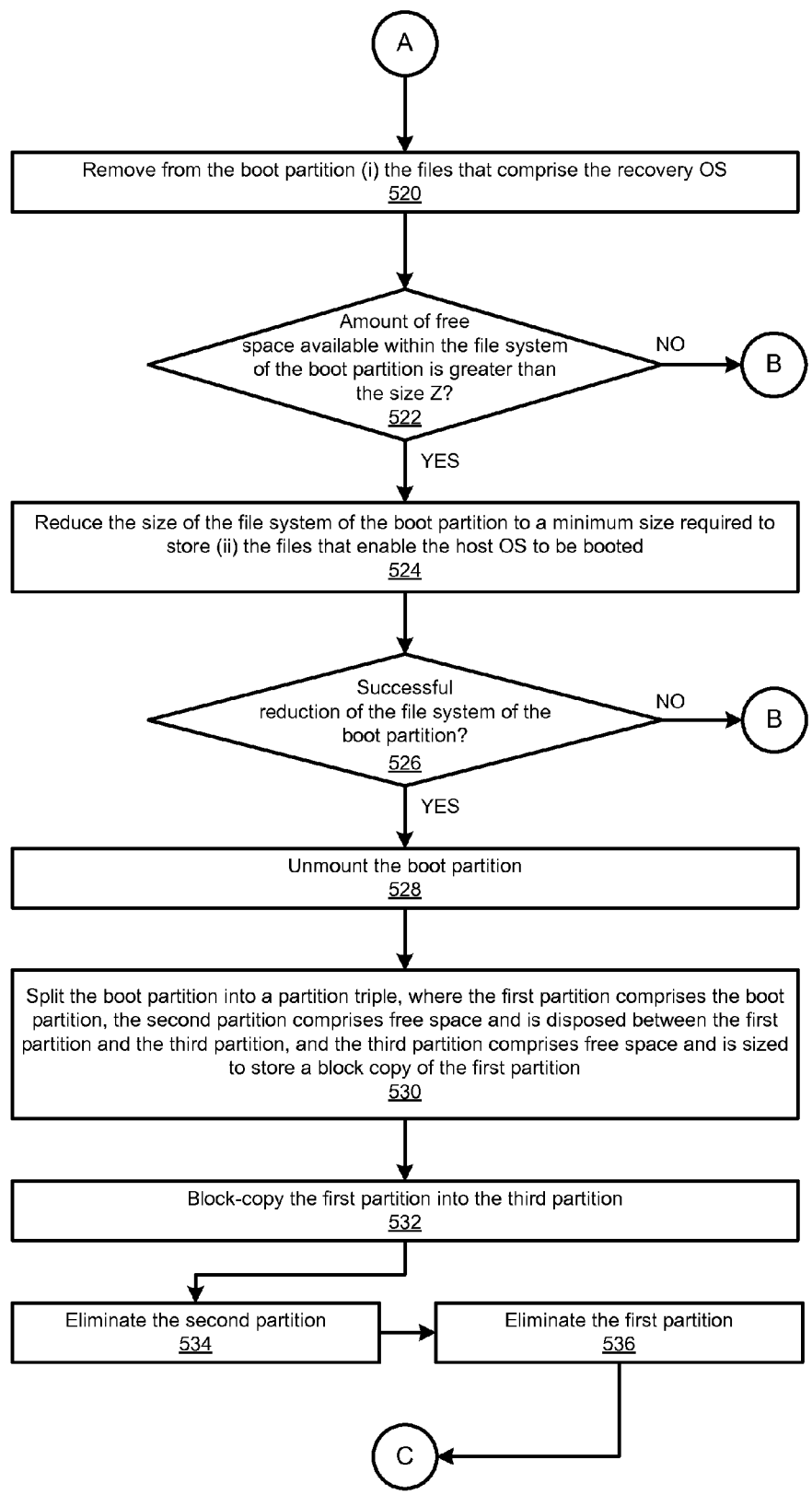
Figure 5C:
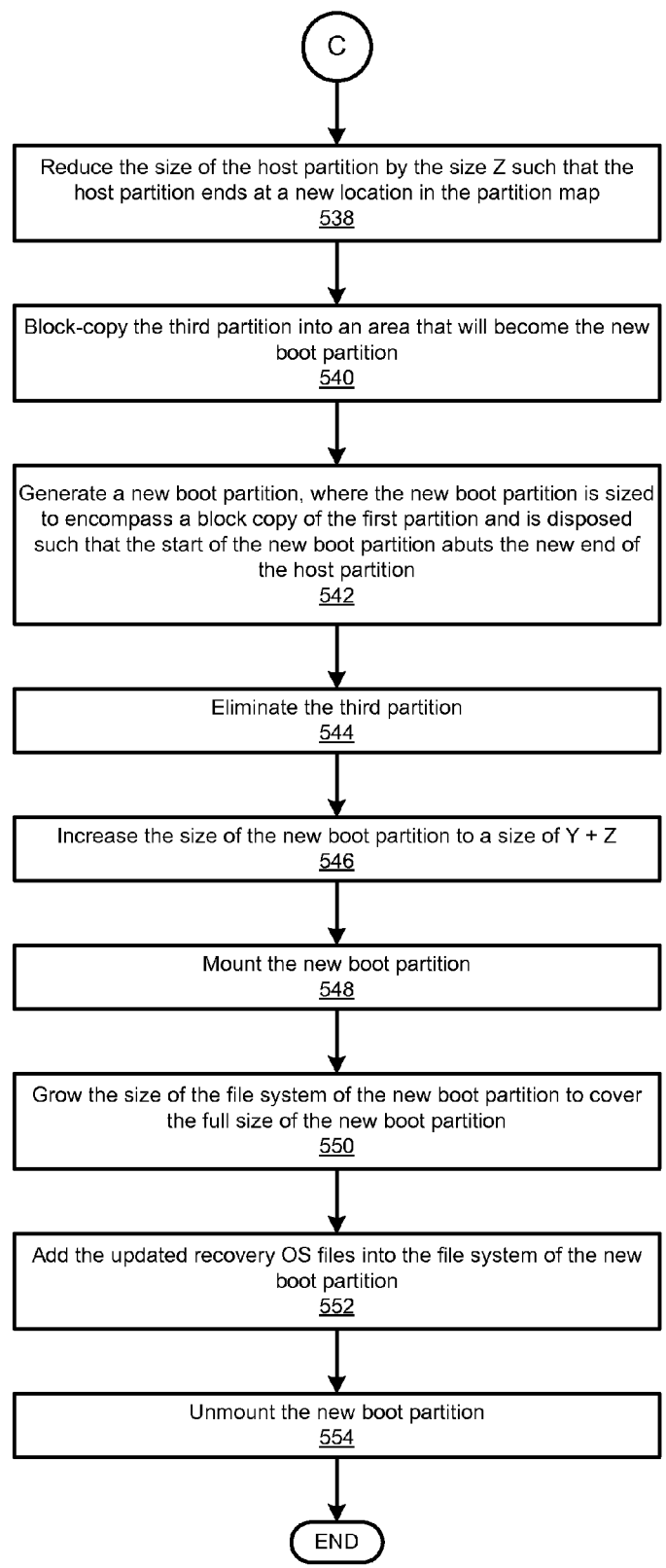

Next, at step 454, the partition manager 150 reduces the size of the file system 408 to produce a file system 408', where the file system 408' is sized to fit the host OS boot files 149-1. Turning now to FIG. 4B, the next step 456 involves the partition manager 150 resizing the boot partition 148 to produce the minimal boot partition 302, where the minimal boot partition 302 is sized to fit the file system 408'. The step 456 also involves the partition manager 150 splitting the minimal boot partition 302 into a partition triple, which includes a temporary partition 303 and the minimal boot copy partition 304. Notably, the minimal boot partition 302, the temporary partition 303 and the minimal boot copy partition 304 exist within the original space occupied by the boot partition 148 such that, up to step 456, the boundaries related to the end of the host partition 146 and the partition limit 401-2 have not been crossed. Notably, the existence of temporary partition 303 serves to avoid creating free space gaps within the partition map 142, which, if encountered by a user, can create confusion and degrade the user's experience.

Next, at step 458, the partition manager 150 executes a block-copy of the file system 408' to generate a file system copy 414 within the minimal boot copy partition 304, where the file system copy 414 includes host OS boot files copy 416. Performing step 458 maintains a way for the computing device 100 to boot (via the host OS boot files copy 416) by preventing overlapping copying from occurring. Next, at step 460, the partition manager 150 eliminates both the minimal boot partition 302 as well as the temporary partition 303.

Figure 4C:
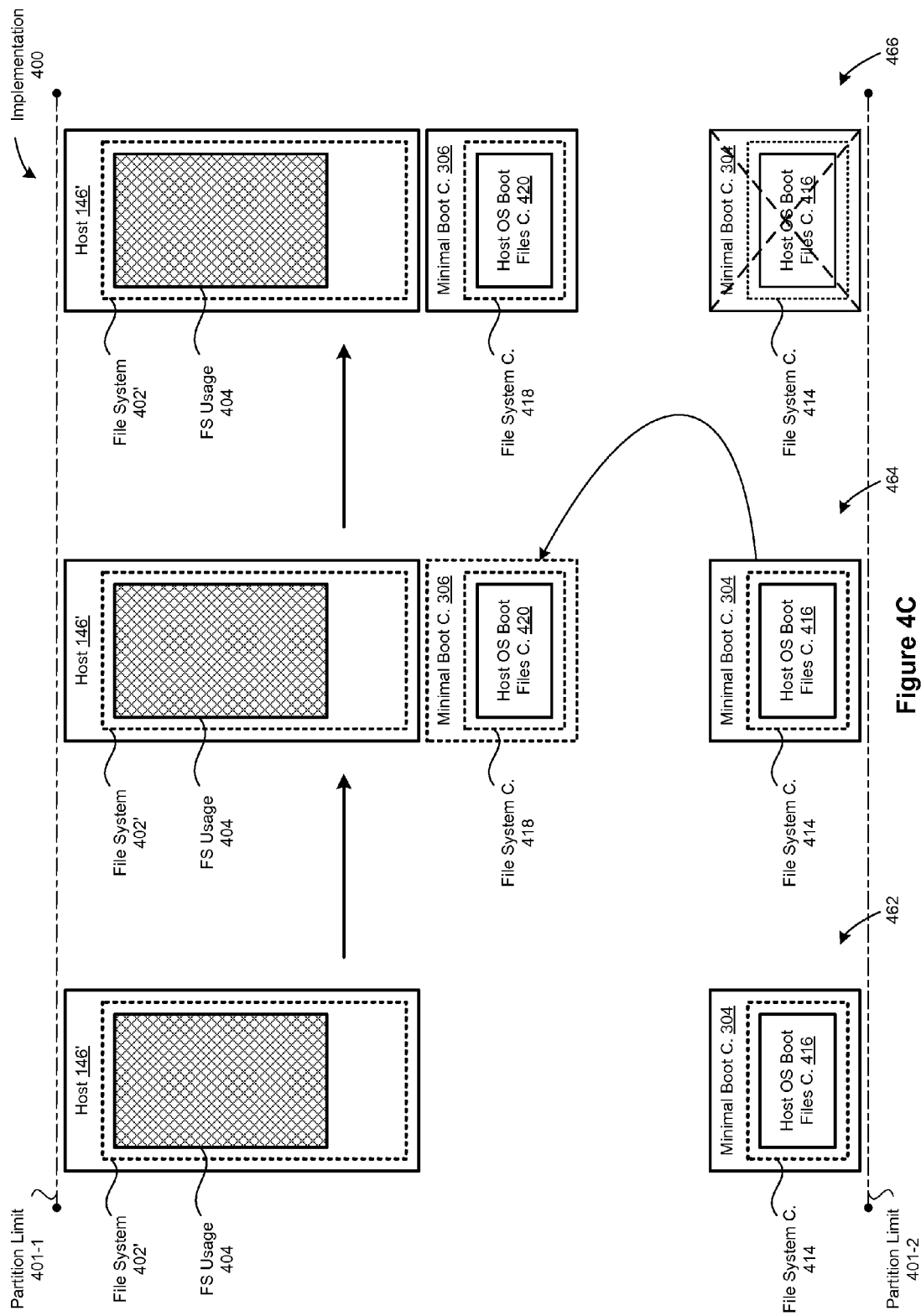

Turning now to FIG. 4C, at step 462, the partition manager 150 resizes the host partition 146 to produce the host partition 146', which is sized to fit the file system 402'. Performing step 462 provides an area that can be used as a starting point for a replacement boot partition that is sized larger than the boot partition 148 by the size Z, which is established via steps 464-472. Next, at step 464, the partition manager 150 generates a minimal boot copy partition 306 that is the same size as the minimal boot partition copy 304, and places the minimal boot copy partition 306 such that the start of the minimal boot copy partition 306 abuts the new end of the host partition 146'. Step 464 also involves the partition manager 150 executing a block-copy of the file system copy 414/host OS boot files copy 416 into the minimal boot copy partition 306 to produce a file system copy 418/host OS boot files copy 420. Notably, this block-copy is performed before the encompassing partition 306 is created since the block-copy can, in some cases, take extended periods of time, and it is desirable to maintain the partition map 142 until definitive changes thereto are effected. Next, at step 466, the partition manager 150 eliminates the minimal boot copy partition 304. Notably, at the end of step 466, the computing device 100 would still be capable of booting via the host OS boot files copy 420. Also, at the end of step 466, there exists room between the current end of the minimal boot copy partition 306 and the partition limit 401-2 such that the minimal boot copy partition 306 can be increased to a final size of Y+Z, the details of which are set below at steps 468-472.

Figure 4D:
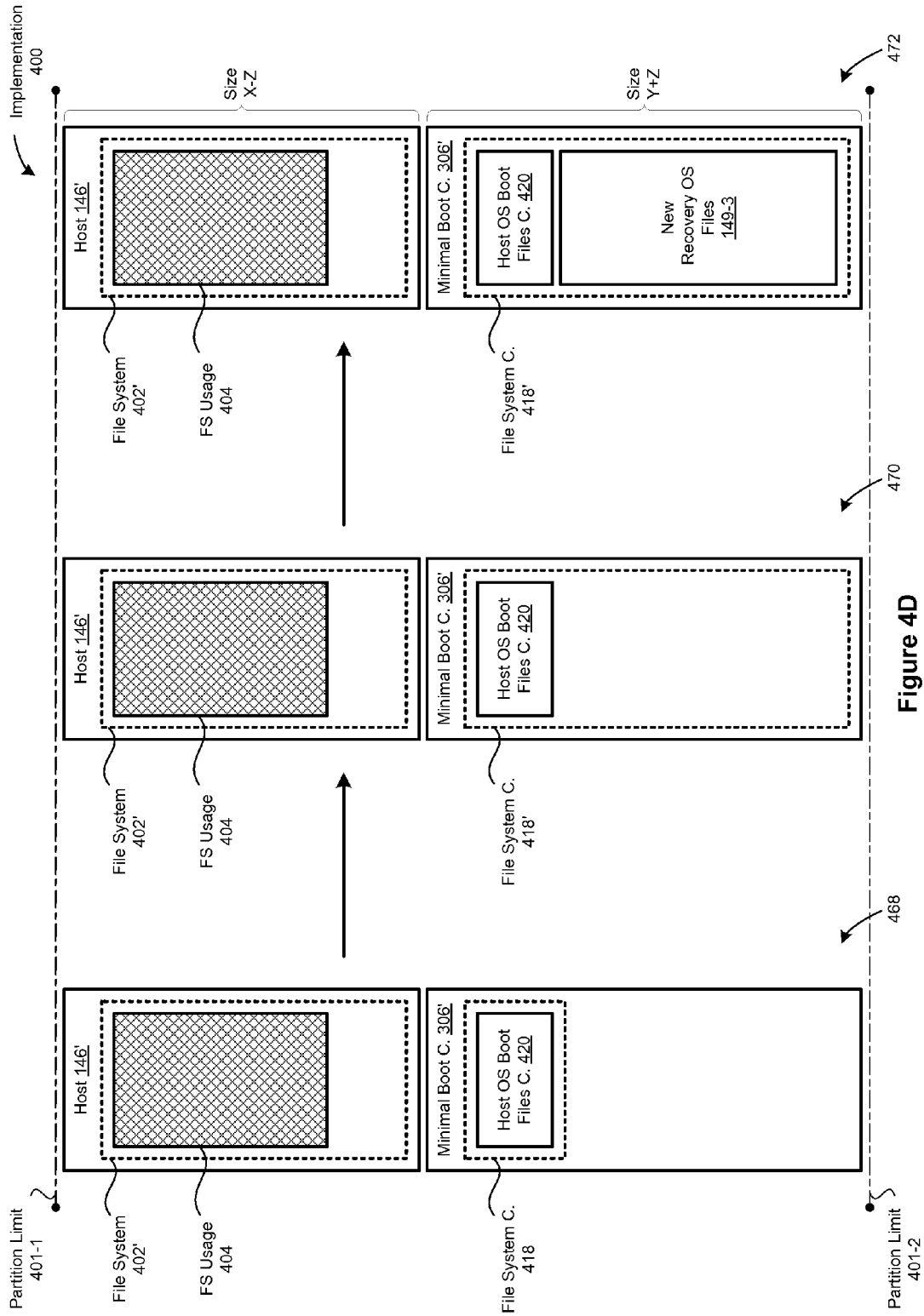

Turning now to FIG. 4D, at step 468, the partition manager 150 increases the size of the minimal boot copy partition 306 to produce minimal boot copy partition 306' such that the end of the minimal boot copy partition 306' abuts the partition limit 401-2. Next, at step 470, the partition manager 150 increases the size of the file system copy 418 to produce file system copy 418', where the file system copy 418' spans the total size of the minimal boot copy partition 306'. Finally, at step 472, the partition manager 150 copies the new recovery OS files 149-3 into the file system copy 418', where the new recovery OS files 149-3 are larger than the recovery OS files 149-2 by the size Z.

FIGS. 5A-5C illustrate a diagram of method steps 500 for dynamically resizing enclosed storage device partitions, according to one embodiment of the present invention. Although the method steps 500 are described in conjunction with the computing device of FIG. 1, persons skilled in the art will understand that any system configured to perform the method steps, in any order, is within the scope of the invention.

As shown in FIG. 5A, the method 500 begins at step 502, where the partition manager 150 identifies a partition map that defines at least a host partition of size X and a boot partition of size Y, where the boot partition is unmounted and configured with a file system that includes (i) files that comprise a recovery OS, and (ii) files that enable a host OS stored on the host partition to be booted.

At step 504, the partition manager 150 receives a request to replace the recovery OS files with updated recovery OS files, where additional storage of size Z is required to store the updated recovery OS files within the boot partition. At step 506, the partition manager 150 determines whether the amount of free space in the file system of the host partition is greater than size Z. If, at step 506, the partition manager 150 determines that free space in the file system of the host partition is greater than size Z, then the method 500 proceeds to step 508. Otherwise, the method 500 ends since there is not enough free space in the host partition to accommodate an increase in the size of the boot partition.

At step 508, the partition manager 150 calculates a size R that represents the size of the boot partition if (i) the files that comprise the recovery OS were to be removed from the boot partition. At step 510, the partition manager 150 determines whether size Z<(size Y−size R). If, at step 510, the partition manager 150 determines that size Z<(Size Y−Size R), then the method 500 proceeds to step 512. Otherwise, the method 500 ends, since removing (i) the files that comprise the recovery OS does not provide enough free space within the partition map such that the boot partition can be resized, copied and relocated according to the various steps described herein.

Next, at step 512, the partition manager 150 reduces the size of the file system of the host partition by the size Z. Reducing the size of the file system of the host partition by the size Z ensures that the amount of space Z is reserved within the host partition and cannot be consumed by another process executing alongside of the method 500, e.g., a user downloading a file that eventually consumes all remaining free space within the host partition. At step 514, the partition manager 150 determines whether the reduction of the file system of the host partition is successful. If, at step 514 the partition manager 150 determines that the reduction of the file system of the host partition is successful, then the method 500 proceeds to step 518. Otherwise, the method 500 proceeds to step 516, where the partition manager 150 rolls back any changes made to the size of the file system of the host partition and the method 500 ends.

At step 518, the partition manager 150 mounts the boot partition. At step 520, which is illustrated in FIG. 5B, the partition manager 150 removes from the boot partition (i) the files that comprise the recovery OS. At step 522, the partition manager 150 determines whether the amount of free space available within the file system of the boot partition is greater than size Z. If, at step 522 the partition manager 150 determines that the amount of free space available within the file system of the boot partition is greater than size Z, then the method 500 proceeds to step 524. Otherwise, the method 500 proceeds to step 516, where the partition manager 150 rolls back any changes made to the size of the file system of the host partition and the method 500 ends.

At step 524, the partition manager 150 reduces the size of the file system of the boot partition to a minimum size required to store (ii) the files that enable the host OS to be booted. At step 526, the partition manager 150 determines whether the reduction of the file system of the boot partition is successful. If, at step 526 the partition manager 150 determines that reduction of the file system of the boot partition is successful, then the method 500 proceeds to step 528. Otherwise, the method 500 proceeds to step 516, where the partition manager 150 rolls back any changes made to the size of the file system of the host partition and the method 500 ends.

At step 528, the partition manager 150 unmounts the boot partition. At step 530, the partition manager 150 splits the boot partition into a partition triple, where the first partition comprises the boot partition, the second partition comprises free space and is disposed between the first partition and the third partition, and the third partition comprises free space and is sized to store a block copy of the first partition.

At step 532, the partition manager 150 block-copies the first partition into the third partition. At step 534, the partition manager 150 eliminates the second partition. At step 536, the partition manager 150 eliminates the first partition. Turning now to FIG. 5C, at step 538, the partition manager 150 reduces the size of the host partition by the size Z such that the host partition ends at a new location in the partition map.

At step 540, the partition manager 150 block-copies the third partition into an area that will become the new boot partition. At step 542, the partition manager 150 generates a new boot partition, where the new boot partition is sized to encompass a block copy of the first partition and is disposed such that the start of the new boot partition abuts the new end of the host partition. At step 544, the partition manager 150 eliminates the third partition. At step 546, the partition manager 150 increases the size of the new boot partition to a size of Y+Z. At step 548, the partition manager 150 mounts the new boot partition. At step 550, the partition manager 150 grows the size of the file system of the new boot partition to cover the full size of the new boot partition.

At step 552, the partition manager 150 adds the updated recovery OS files of step 504 into the file system of the new boot partition. At step 554, the partition manager 150 unmounts the new boot partition, whereupon the method 500 ends.

In sum, embodiments of the invention provide a technique for updating a recovery operating system (OS) stored in a boot partition of a storage device. A partition manager executes on a host OS and is configured to carry out the update while the host OS is executing on the computing device. The partition manager receives a request to update the recovery OS, determines that the recovery OS update requires additional storage space to be added to the boot partition, decreases the size of the host partition according to the techniques described herein, increases the size of the boot partition according to the techniques described herein, and then updates the recovery OS according to the techniques described herein.

One advantage of the embodiments of the invention is that at least one copy of the host OS boot files remains intact throughout the entire recovery OS upgrade process, thereby providing a way for the computing device to boot even if the recovery OS upgrade is interrupted or is unsuccessful. Another advantage is that the size of the boot partition can be increased by a small number as opposed to doubling the size of the boot partition, which would be wasteful and unnecessary in most recovery OS upgrade scenarios. Another advantage is that only a small amount of temporary space is needed to carry out the techniques described herein, thereby enabling the technique to be executed on a computing device where the storage device included therein is nearly full.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A computer-implemented method for updating a recovery operating system (OS) stored in a boot partition of a storage device, comprising:
   booting, via host operating system (OS) boot files stored in the boot partition, a host OS that is stored in a host partition of the storage device, wherein a size of the host partition is size X and a size of the boot partition is size Y;
   receiving a request to update a current recovery OS stored in the boot partition with an updated recovery OS;
   determining that the updated recovery OS requires additional storage space of size Z to be added to the boot partition;
   determining a size R that represents the size of the boot partition if a set of recovery OS files associated with the current recovery OS were to be removed from the boot partition; and
   in response to a determination that the size Z<(size Y−size R):
      decreasing the size of the host partition by the size Z such that the host partition is of a size X−Z,
      increasing the size of the boot partition by the size Z such that the boot partition is of a size Y+Z and
      copying the updated recovery OS into the boot partition of the size Y+Z.

2. The method of claim 1, further comprising determining that the host partition includes a size of free storage space that is greater than or equal to the size Z.

3. The method of claim 1, wherein decreasing the size of the host partition by the size Z includes decreasing a size of a file system included in the host partition by the size Z.

4. The method of claim 1, wherein increasing the size of the boot partition by the size Z includes:
   removing the set of recovery OS files from the boot partition,
   reducing the size of the boot partition to create a minimal boot partition that retains the host OS boot files,
   creating a new boot partition that stores a copy of the minimal boot partition and abuts an ending point of the host partition of the size X−Z, and
   increasing a size of the new boot partition to the size Y+Z.

5. The method of claim 4, wherein the current recovery OS is corrupted during increasing the size of the boot partition and the host OS can still be booted via the retained host OS boot files.

6. The method of claim 1, wherein an ending point of the host partition abuts a starting point of the boot partition.

7. The method of claim 6, wherein a starting point of the host partition abuts an ending point of a first partition included in the storage device, and an ending point of the boot partition abuts a starting point of a second partition included in the storage device.

8. The method of claim 1, wherein decreasing the size of the host partition by the size Z and increasing the size of the boot partition by the size Z are carried out while the host OS is executing.

9. The method of claim 4, wherein an amount of free space available in the boot partition is determined to be greater than the size Z prior to reducing the size of the boot partition.

10. A non-transitory computer-readable medium storing instructions that, when executed by a processor of a computing device, cause the computing device to carry out steps that include:
    booting, via host operating system (OS) boot files stored in a boot partition, a host OS that is stored in a host partition of a storage device, wherein a size of the host partition is size X and a size of the boot partition is size Y;
    receiving a request to update a current recovery OS stored in the boot partition with an updated recovery OS;
    determining that the updated recovery OS requires additional storage space of size Z to be added to the boot partition;
    determining a size R that represents the size of the boot partition if a set of recovery OS files associated with the current recovery OS were to be removed from the boot partition; and
    in response to a determination that the size Z<(size Y−size R):
       decreasing the size of the host partition by the size Z such that the host partition is of a size X−Z,
       increasing the size of the boot partition by the size Z such that the boot partition is of a size Y+Z and
       copying the updated recovery OS into the boot partition of the size Y+Z.

11. The non-transitory computer-readable medium of claim 10, wherein the steps further include determining that the host partition includes a size of free storage space that is greater than or equal to the size Z.

12. The non-transitory computer-readable medium of claim 10, wherein decreasing the size of the host partition by the size Z includes decreasing a size of a file system included in the host partition by the size Z.

13. The non-transitory computer-readable medium of claim 10, wherein increasing the size of the boot partition by the size Z includes:
    removing the set of recovery OS files from the boot partition,
    reducing the size of the boot partition to create a minimal boot partition that retains the host OS boot files,
    creating a new boot partition that stores a copy of the minimal boot partition and abuts an ending point of the host partition of the size X−Z, and
    increasing a size of the new boot partition to the size Y+Z.

14. The non-transitory computer-readable medium of claim 13, wherein the current recovery OS is corrupted during increasing the size of the boot partition and the host OS can still be booted via the retained host OS boot files.

15. The non-transitory computer-readable medium of claim 10, wherein an ending point of the host partition abuts a starting point of the boot partition.

16. The non-transitory computer-readable medium of claim 15, wherein a starting point of the host partition abuts an ending point of a first partition included in the storage device, and an ending point of the boot partition abuts a starting point of a second partition included in the storage device.

17. The non-transitory computer-readable medium of claim 10, wherein decreasing the size of the host partition by the size Z and increasing the size of the boot partition by the size Z are carried out while the host OS is executing.

18. The non-transitory computer-readable medium of claim 13, wherein an amount of free space available in the boot partition is determined to be greater than the size Z prior to reducing the size of the boot partition.

19. A system, comprising:
a storage device; and
a processor configured to cause the system to:
- boot, via host operating system (OS) boot files stored in a boot partition, a host OS that is stored in a host partition of the storage device, wherein a size of the host partition is size X and a size of the boot partition is size Y;
- receive a request to update a current recovery OS stored in the boot partition with an updated recovery OS;
- determine that the updated recovery OS requires additional storage space of size Z to be added to the boot partition;
- determine a size R that represents the size of the boot partition if a set of recovery OS files associated with the current recovery OS were to be removed from the boot partition; and
- in response to a determination that the size Z<(size Y−size R):
  - decrease the size of the host partition by the size Z such that the host partition is of a size X−Z,
  - increase the size of the boot partition by the size Z such that the boot partition is of a size Y+Z, and
  - copy the updated recovery OS into the boot partition of the size Y+Z.

20. The system of claim 19, wherein the processor is configured to further cause the system to determine that the host partition includes a size of free storage space that is greater than or equal to the size Z.

\* \* \* \* \*